(12) United States Patent
Wang et al.

(10) Patent No.: US 8,337,007 B2
(45) Date of Patent: Dec. 25, 2012

(54) CURABLE SUBLIMATION INK AND SUBLIMATION TRANSFER PROCESS USING SAME

(75) Inventors: Yulin Wang, Oakville (CA); Ke Zhou, Oakville (CA); Tie Hwee Ng, Mississauga (CA); Marko Saban, Toronto (CA)

(73) Assignee: Xerox Corporation, Norwalk, CT (US)

( * ) Notice: Subject to any disclaimer, the term of this patent is extended or adjusted under 35 U.S.C. 154(b) by 220 days.

(21) Appl. No.: 12/856,999

(22) Filed: Aug. 16, 2010

(65) Prior Publication Data

US 2012/0038723 A1 Feb. 16, 2012

(51) Int. Cl.
*B41J 2/01* (2006.01)
*B41J 29/38* (2006.01)
*G01D 11/00* (2006.01)

(52) U.S. Cl. ............................ 347/102; 347/9; 347/100
(58) Field of Classification Search .................. None
See application file for complete search history.

(56) References Cited

U.S. PATENT DOCUMENTS

| | | | |
|---|---|---|---|
| 4,081,277 A | 3/1978 | Brault et al. |
| 4,935,326 A | 6/1990 | Creatura et al. |
| 4,937,166 A | 6/1990 | Creatura et al. |
| 5,290,654 A | 3/1994 | Sacripante et al. |
| 5,308,734 A | 5/1994 | Sacripante et al. |
| 5,366,836 A | 11/1994 | Snelling |
| 5,370,963 A | 12/1994 | Patel et al. |
| 5,436,217 A | 7/1995 | Van Steen et al. |
| 5,593,807 A | 1/1997 | Sacripante et al. |
| 5,902,771 A | 5/1999 | Slark et al. |
| 5,917,530 A | 6/1999 | Hutt et al. |
| 6,052,139 A | 4/2000 | Hetzer |
| 6,057,264 A | 5/2000 | Bradbury |
| 6,170,933 B1 | 1/2001 | Nitta et al. |
| 6,270,933 B1 | 8/2001 | Thompson |
| 6,713,222 B2 | 3/2004 | Sacripante et al. |
| 6,800,166 B2 | 10/2004 | Kosaka et al. |
| 6,832,832 B2 | 12/2004 | Martin et al. |
| 6,849,311 B2 | 2/2005 | Yoshinari et al. |
| 6,946,424 B2 | 9/2005 | Ieshige et al. |
| 6,951,696 B2 | 10/2005 | Ozaki |
| 7,029,817 B2 | 4/2006 | Robinson et al. |
| 7,033,974 B2 | 4/2006 | Ishida et al. |
| 7,138,163 B2 | 11/2006 | Ieshige et al. |
| 7,234,805 B2 | 6/2007 | Maekawa et al. |

(Continued)

OTHER PUBLICATIONS

U.S. Patent Application filed of even date herewith, of Yulin Wang et al., entitled "Curable Sublimation Marking Material And Sublimation Transfer Process Using Same" 67 pages, 4 drawing sheets, U.S. Appl. No. 12/856,975, not yet published.

(Continued)

*Primary Examiner* — Stephen Meier
*Assistant Examiner* — Alexander C Witkowski
(74) *Attorney, Agent, or Firm* — Marylou J. Lavoie

(57) ABSTRACT

A transfer printing method including applying a curable sublimation ink having at least one curable component and at least one sublimation colorant in a desired pattern onto a transfer substrate to form an image on the transfer substrate at a first temperature which is below the sublimation temperature of the sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

17 Claims, 4 Drawing Sheets

U.S. PATENT DOCUMENTS

| | | | |
|---|---|---|---|
| 7,237,886 B2 | 7/2007 | Maekawa et al. | |
| 7,259,275 B2 | 8/2007 | Belelie et al. | |
| 7,279,587 B2 | 10/2007 | Odell et al. | |
| 7,329,476 B2 | 2/2008 | Sacripante et al. | |
| 7,432,324 B2 | 10/2008 | Chen et al. | |
| 7,479,307 B2 | 1/2009 | Fromm et al. | |
| 7,510,617 B2 | 3/2009 | Kosaka et al. | |
| 7,531,582 B2 | 5/2009 | Toma et al. | |
| 7,578,587 B2 | 8/2009 | Belelie et al. | |
| 7,625,956 B2 | 12/2009 | Odell et al. | |
| 7,714,040 B2 | 5/2010 | Toma et al. | |
| 2005/0191573 A1 | 9/2005 | Smith | |
| 2005/0199152 A1* | 9/2005 | Hale et al. | 101/491 |
| 2006/0100300 A1 | 5/2006 | Sacripante et al. | |
| 2006/0216626 A1 | 9/2006 | Sacripante et al. | |
| 2008/0107990 A1 | 5/2008 | Field et al. | |
| 2008/0236446 A1 | 10/2008 | Zhou et al. | |
| 2009/0047593 A1 | 2/2009 | Vanbesien et al. | |

OTHER PUBLICATIONS

U.S. Patent Application filed of even date herewith, of Yulin Wang et al., entitled "Curable Sublimation Toner And Sublimation Transfer Process Using Same" 67 pages, 4 drawing sheets, U.S. Appl. No. 12/856,987, not yet published.

U.S. Patent Application filed Nov. 3, 2009, of Yulin Wang et al., entitled "Chemical Toner Containing Sublimation Colorant For Secondary Transfer Process" 44 pages, U.S. Appl. No. 12/611,336, not yet published.

* cited by examiner

CURABLE SUBLIMATION INK AND SUBLIMATION TRANSFER PROCESS USING SAME

RELATED APPLICATIONS

Commonly assigned U.S. patent application Ser. No. 12/856,987, filed of even date herewith, of Yulin Wang, Ke Zhou, T. Hwee Ng, and Marko Saban, entitled "Curable Sublimation Toner And Sublimation Transfer Process Using Same," which is hereby incorporated by reference herein in its entirety, describes a transfer printing method including applying a curable sublimation toner having at least one curable component and at least one sublimation colorant in a desired pattern onto a transfer substrate to form an image on the transfer substrate at a first temperature which is below a sublimation temperature of the sublimation colorant; wherein the curable sublimation toner is a conventional toner or a chemical toner; and wherein the curable sublimation toner includes at least one curable amorphous resin and optionally, a crystalline resin; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Commonly assigned U.S. patent application Ser. No. 12/856,975, filed of even date herewith, of Yulin Wang, Ke Zhou, T. Hwee Ng, and Marko Saban, entitled "Curable Sublimation Marking Material And Sublimation Transfer Process Using Same," which is hereby incorporated by reference herein in its entirety, describes a curable sublimation marking material including at least one curable component and at least one sublimation colorant. Also described is a transfer printing method including applying a curable sublimation marking material in a desired pattern onto a transfer substrate to form an image on the transfer substrate at a first temperature which is below a sublimation temperature of the sublimation colorant; wherein the curable sublimation marking material comprises at least one curable component and at least one sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Commonly assigned U.S. patent application Ser. No. 12/611,336, filed Nov. 3, 2009, of Yulin Wang, Ke Zhou, Edward G. Zwartz, and T. Hwee Ng, entitled "Chemical Toner Containing Sublimation Colorant For Secondary Transfer Process," which is hereby incorporated by reference herein in its entirety, describes a chemical toner composition that includes at least one curable amorphous resin and at least one sublimation colorant.

BACKGROUND

Disclosed herein is a curable sublimation ink and a transfer printing method comprising applying a curable sublimation ink comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate and heating to a second temperature which is sufficient to cause the sublimation colorant to sublime and form a permanent image on the final image-receiving substrate.

Transfer printing processes and materials are in great demand. The imaging of textiles and other substrates using thermal transfer of sublimation dyes has been commercially practiced for more than 50 years. Transfer printing generally comprises preparing a transfer sheet or substrate bearing the image to be transferred, and subsequently transferring the image from the transfer sheet or substrate to a permanent substrate upon which the image is to permanently appear. The original printers for sublimation printing processes employed electrostatic printing technology using toners and marking materials. More recently, sublimation printing processes employ large format ink jet printers using specially formulated inks.

Generally, a sublimation dye process consists of two steps. In a first step, an ink or a toner containing a sublimation dye creates an image on a transfer sheet. In a second step, heating transfers the image to a permanent substrate. With heating, the sublimation dye vaporizes and is transferred onto the final substrate. Current sublimation dye processes can have disadvantages. For example, sublimation inks can require an organic solvent which needs to be evaporated. Sublimation toners can offset onto the permanent substrate or require excessive heating. For both ink and toner, the sublimation processes can be high energy processes.

Ink jet ink sublimation transfer printing typically employs sublimation dye inks comprising a pigment suspended in a liquid solvent such as water. The transfer printing process generally comprises two processes: a first transfer process wherein images are initially printed on an intermediate, such as coated transfer paper, as a reverse image of the final design; and a second transfer process wherein the reverse image is transferred from the transfer paper onto a final substrate, such as polyester fabric, typically using a heat press operating at an elevated temperature, such as from about 180° C. to about 210° C. Under high temperature and pressure, the dye turns into a gas, permeates the fabric, and then solidifies into its fibers. The fabric is permanently dyed with the final image and can be washed without damaging the quality of the image.

Traditional ink jet sublimation transfer inks are water based systems. Unlike traditional water-soluble ink jet inks containing dyes, sublimation transfer ink jet ink including a sublimation dye tends to cause clogging believed due to the generation of precipitates (aggregates), degradation of dispersion stability, and/or evaporation of moisture from the nozzles. In particular, when the printing apparatus is not operated for a long time, clogging is likely to occur due to evaporation of moisture. To address this issue, a humectant can be added to suppress the evaporation of moisture. However, the sublimation transfer method requires heating for a predetermined time at temperatures higher than the sublimation point of the sublimation dye. Therefore, even if a high-boiling organic solvent is used as a humectant, the solvent is evaporated at the heating temperature during sublimation transfer, resulting in environmental pollution.

Sublimation dye has been used in xerographic technology. Most color toner systems currently in use are formulated with low melt viscosity resin which can make the toner too tacky and sticky for use in sublimation dye transfer sheets which are used at elevated temperatures. These toner systems can prevent clean transfer of the dye alone (that is, free of unwanted resin transfer). Toners employing high molecular weight polymer resin have been proposed as an alternative to low molecular weight linear polymer resins, wherein the high molecular weight resin is from about 75,000 to about 300,000 and preferably above about 300,000 and where the Tg of the binder resin is at least about 160° C. However, the high molecular weight and high Tg polymer can require a very high temperature during the first fixing stage which is not an environmentally advantageous procedure and further can cause pre-sublimation of the dye.

U.S. Pat. No. 7,237,886, which is hereby incorporated by reference herein in its entirety, describes, in the Abstract thereof, an ink for sublimation transfer ink jet recording including water, at least one sugar alcohol containing not less than four OH groups, a sublimation dye, and a dispersant. The ink is printed on a sheet medium by ink jet printing, and then the sheet medium is heated to sublimate and transfer the sublimation dye onto an object to be dyed. The ink for ink jet recording and the sublimation transfer dyeing method using the ink not only can maintain performances such as storage stability and high-quality recording images, but also can reduce environmental pollution, effectively prevent nozzle clogging, and exhibit good dispersion stability. See also, U.S. Pat. No. 6,713,222, which is hereby incorporated by reference herein in its entirety.

Thermal transfer sublimation dyes have been incorporated into toners for sublimation transfer processes using laser printers for use, for example, with personal computers.

U.S. Pat. No. 6,270,933, which is hereby incorporated by reference herein in its entirety, describes, in the Abstract thereof, a commercially useful color thermal transfer dye sublimation toner comprising at least a binder resin and a sublimation dye component, the binder resin comprising a high molecular weight polymer having a molecular weight of about 75,000, and a temperature, $T_1$, of at least about 160° C., at which the viscosity is equal to $1 \times 10^3$, and the sublimation dye comprising a dye which sublimes at elevated temperatures above about 100° C. The invention further defines a process for the use of the toner.

U.S. Pat. No. 6,270,933, which is hereby incorporated by reference herein in its entirety, describes, in the Abstract thereof, a process for crosslinking an image comprising applying ultraviolet light to an image comprised of a toner containing an unsaturated resin and colorant.

U.S. Pat. No. 5,366,836, which is hereby incorporated by reference herein in its entirety, describes, in the Abstract thereof, a process for forming color xerographic images by using a toner which comprises one or more dyes. Also disclosed is a process for making a toner which comprises one or more dyes.

U.S. Patent Publication 2006/0100300, U.S. Ser. No. 10/981,528, which is hereby incorporated by reference herein in its entirety, describes, in the Abstract thereof, a composition including an unsaturated sulfopolyester amine resin, and processes for preparing and using thereof.

U.S. Pat. No. 7,479,307, which is hereby incorporated by reference herein in its entirety, describes, in the Abstract thereof, toner compositions comprised of a polymer, an optional colorant, and an UV light curable oligomer. Also disclosed are methods for producing a UV curable toner composition, the toner compositions produced thereby, and methods of utilizing the UV curable toner compositions in various painting applications.

U.S. Pat. No. 6,713,222, which is hereby incorporated by reference herein in its entirety, describes, in the Abstract thereof, a process for crosslinking an image comprising applying ultraviolet light to an image comprised of a toner containing an unsaturated resin and colorant.

U.S. Pat. No. 6,713,222, which is hereby incorporated by reference herein in its entirety, describes, in the Abstract thereof, an ink-jet ink composition suitable for use in secondary transfer processes wherein the ink-jet ink composition contains a pre-dispersion containing at least a sublimation colorant combined with an ink-jet ink containing at least a non-sublimable colorant. Upon printing, a monochrome substrate, a multi-color image can be transferred to a permanent substrate with the application of heat and pressure. The monochrome intermediate transfer image is created by the non-sublimable colorant upon printing. The multi-color permanent image is generated as elevated temperatures and pressure of the transfer process cause the sublimation colorant to sublime and bond to the permanent substrate.

Currently available materials and processes for sublimation transfer are suitable for their intended purposes. However, a need remains for improved materials and methods for sublimation transfer applications. Specifically, a need remains for improved sublimation transfer materials and processes that are free of the potential adverse effect of oxidation-reduction on the sublimation dye as can be found with non-solvent humectants (sugar alcohol) in water based inks. Further, a need remains for improved sublimation transfer materials and processes that are green, for example, that do not require a high temperature in the fixing stage, and that do not cause the sublimation dye to pre-sublimate in the fixing stage.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a transfer printing method comprising applying a curable sublimation ink comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Further described is a curable sublimation ink comprising at least one curable component and at least one sublimation colorant.

DETAILED DESCRIPTION

Figure 1:
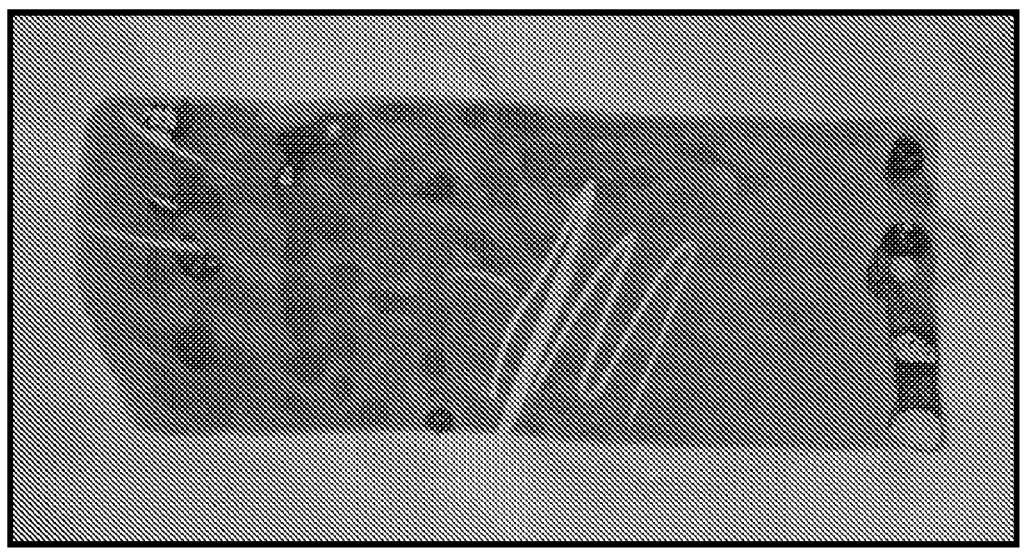
FIG. 1 illustrates a sublimation dye image (before curing) drawn down on Xerox® Digital Color Elite Gloss Paper coated paper.

Described is a sublimation transfer printing process based on sublimation dye technology. In embodiments, a curable sublimation ink is described comprising at least one curable component and at least one sublimation colorant.

The curable sublimation ink can be any suitable or desired material provided that the ink is curable and capable of performing sufficiently in a sublimation transfer printing process. The term "curable" refers, for example, to the component or combination of components being polymerizable, that is, a material that may be cured via polymerization, including free radical routes, and/or in which polymerization is photo-initiated through use of a radiation sensitive photoinitiator. The curing method can comprise any suitable or desired curing method, in embodiments, thermal curing, radiation curing, and ultraviolet radiation curing.

In embodiments, the curable sublimation ink can be a traditional imaging material comprising at least one curable component; at least one monomer, and at least one initiator; or a digital imaging material comprising at least one curable component; at least one monomer, oligomer, or prepolymer; optionally, at least one gellant, and at least one initiator. In embodiments, the curable sublimation ink comprises digital imaging materials, including, but not limited to, ink jet imaging materials, laser imaging materials, phase change imaging materials, and the like, and traditional imaging materials, including, but not limited to, offset imaging materials, gravure imaging materials, flexographic imaging materials, lithographic imaging materials, ribbon or screen printing imaging materials, and the like. Examples of suitable curable sublimation marking materials include, but are not limited to, curable materials including aqueous ink jet inks, oil inks, solid inks, phase change inks, gellant inks, digital inks, laser imaging materials, offset inks, gravure inks, flexographic inks, lithographic inks, ribbon or screen printing inks, conventional toners, chemical toners, emulsion aggregation toners, and the like.

The transfer printing method herein is meant to encompass any image forming method suitable for use with the selected curable sublimation ink and can include traditional printing, ink jet printing, xerographic imaging, draw down imaging, although not limited. In embodiments, the process includes a transfer printing method comprising applying a curable sublimation ink comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate and heating to a second temperature which is sufficient to cause the sublimation colorant to sublime and form a permanent image on the final image-receiving substrate.

In embodiments, a curable sublimation transfer marking material herein comprises a conventional ink comprising a monomer, a photoinitiator, and a colorant. In other embodiments, a curable sublimation transfer marking material herein comprises an ink jet ink comprising a monomer, an oligomer, a photoinitiator, and a colorant.

In certain embodiments, a curable sublimation transfer marking material herein comprises a curable ink jet ink, in embodiments an ultra-violet (UV) curable ink jet ink, wherein the ink jet ink comprises at least one curable monomer, at least one oligomer or prepolymer, an optional initiator, and at least one sublimation colorant such as a sublimation dye or pigment and optional additives. In embodiments, the curable sublimation marking material is a phase change ink comprising at least one curable component such as a curable monomer or prepolymer; at least one monomer, oligomer, or prepolymer; optionally, at least one gellant, and an optional initiator.

In embodiments, the ink can be printed through piezoelectric print heads to produce a full color image, in the reverse format, on the transfer sheet, such as paper, followed by exposing via a curing system, in embodiments a UV curing system. The image can be cured quickly due to the extremely fast photo-induced crosslinking. A subsequent application of heat and, optionally, pressure, can be used to transfer the dye previously printed on the transfer sheet to a permanent substrate, for example, fabric, to provide a full color image without transferring resin component to the permanent substrate. Further, in embodiments, no solvent evaporation is experienced, thereby eliminating environment pollution from the transfer process.

The present disclosure encompasses use of the curable sublimation marking material, in embodiments, curable toner, curable ink, curable gellant ink, and curable phase change ink, in various technologies include textile printing and security imaging applications.

In embodiments, a curable phase change ink composition for sublimation transfer printing using ink jet technology is described. In further embodiments, a curable toner composition using xerographic technology for sublimation transfer printing is provided. The curable ink or toner comprises sublimation dyes or pigments and curable resin, which can provide a full color image, in the reverse format, on a transfer sheet, such as paper. The images can be cured on the transfer sheet, followed by application of heat, and optionally pressure, to transfer the dye or pigment to the final image-receiving substrate. The cross-linked resin remains on the transfer sheet. The permanent substrate, can be any suitable or desired final image receiving substrate, including, but not limited to, paper, plastic, fabric, ceramic, glass, and metals, and can include substrates where direct printed is not feasible due to the size, shape, thickness, or surface energy challenges of the permanent substrate.

Any suitable or desired curable component can be selected for the curable sublimation ink. In embodiments, the at least one curable component comprises an acrylate, methacrylate, alkene, vinyl, or allylic ether functional group. In embodiments, the at least one curable component comprises at least one curable monomer or prepolymer that is a multifunctional acrylate or methacrylate compound. In specific embodiments, the multifunctional acrylate or methacrylate compound is propoxylated neopentyl glycol diacrylate, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, hexanediol diacrylate, tripropylene glycol diacrylate, dipropylene glycol diacrylate, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, or mixtures or combinations thereof.

Any suitable or desired monomer, oligomer, or prepolymer can be selected, in embodiments, the at least one monomer, oligomer, or prepolymer is an acrylate monomer, a methacrylate monomer, a multifunctional acrylate monomer, a multifunctional methacrylate monomer, a difunctional cycloaliphatic acrylate monomer, a trifunctional monomer, an acrylate ester, a dimethanol diacrylate cyclohexane difunctional monomer, an isocyanurate triacrylate trifunctional monomer, behenyl acrylate, acrylate curable wax, a low viscosity polyester acrylate monomer, a urethane acrylate, an epoxy, a polyester, or a mixture or combination thereof.

In embodiments, the curable sublimation ink is a phase change ink comprising at least one curable component; at least one monomer, oligomer, or prepolymer; optionally, at least one gellant, and at least one initiator; wherein the at least one curable component comprises an acrylate, methacrylate, alkene, vinyl, or allylic ether functional group; wherein the at least one monomer, oligomer, or prepolymer is an acrylate monomer, a methacrylate monomer, a multifunctional acrylate monomer, a multifunctional methacrylate monomer, a difunctional cycloaliphatic acrylate monomer, a trifunctional monomer, an acrylate ester, a dimethanol diacrylate cyclohexane difunctional monomer, an isocyanurate triacrylate trifunctional monomer, behenyl acrylate, acrylate curable wax, a low viscosity polyester acrylate monomer, a urethane acrylate, an epoxy, a polyester, or a mixture or combination thereof; and wherein the initiator is a free-radical photoinitiator or photoinitiating moiety or an ultraviolet radiation activated photoinitiator. In embodiments, the inks herein can comprise components such as described in U.S. Pat. Nos. 7,578,587 and 7,531,582, each of which are hereby incorporated by reference herein in their entireties.

In embodiments, the curable inks are radiation curable. The term "radiation curable" is intended to cover all forms of curing upon exposure to a radiation source, including light and heat sources and including in the presence or absence of initiators. Radiation curing routes include, but are not limited to, curing using ultraviolet (UV) light, for example having a wavelength of about 200 to about 400 nanometers or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof. In specific embodiments, curing herein comprises thermal curing or radiation curing, such as ultra-violet curing.

In embodiments, the initiator is a free-radical photoinitiator or photoinitiating moiety or an ultraviolet radiation activated photoinitiator.

In embodiments, a UV curable ink jet sublimation marking material herein comprises one or more low-viscosity polyester acrylate monomers, one or more high-molecular weight components, in embodiments having a molecular weight of from about 10,000 to about 30,000, including, but not limited to, acrylated urethanes, epoxies, polyesters, and acrylate oligomers, a photoinitiator, at least one sublimation dye or pigment, and optional additives.

The curable sublimation ink can comprise an ultra-violet curable phase change ink comprising at least one low viscosity monomer, at least one high molecular weight monomer or oligomer, and an optional initiator. In embodiments, the low viscosity monomer comprises low viscosity polyesters, acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Different monomer and oligomers can also be added to tune the plasticity or elasticity of the cured objects. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof. When a reactive diluent is added to the ink carrier material, the reactive diluent is added in any desired or effective amount, in one embodiment at least about 1 percent to no more than about 80 percent by weight of the carrier, and in another embodiment at least about 35 percent to no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003®, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

In another embodiment, the curable ink comprises a phase change ink vehicle comprising a radiation curable monomer or prepolymer; a photoinitiator; a reactive wax; and a gellant. Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L.

Belelie, the disclosure of which is incorporated by reference herein in its entirety. In embodiments, the gellant can be a compound of the formula

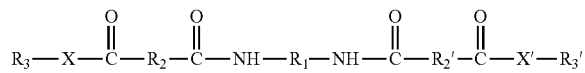

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, in embodiments having from 1 to 4 carbon atoms, (ii) an arylene group, including substituted and unsubstituted arylene groups, and wherein heteroatoms either may or may not be present in the arylene group, in embodiments having from 5 to 14 carbon atoms, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, in embodiments having from 6 to 32 carbon atoms, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, in embodiments having from 6 to 32 carbon atoms, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, in embodiments having from 1 to 54 carbon atoms, (ii) arylene groups, including substituted and unsubstituted arylene groups, and wherein heteroatoms either may or may not be present in the arylene group, in embodiments having from 5 to 14 carbon atoms, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, in embodiments having 6 to 32 carbon atoms, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, in embodiments having 6 to 32 carbon atoms, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, having 2 to 100 carbon atoms, (ii) aryl groups, including substituted and unsubstituted aryl groups, wherein heteroatoms either may or may not be present in the aryl group, in embodiments having 5 to 100 carbon atoms, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in embodiments having 6 to 100 carbon atoms, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in embodiments having 6 to 100 carbon atoms, and X and X' each, independently of the other, is an oxygen atom or a group of the formula —$NR_4$—, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, in embodiments having 1 to 100 carbon atoms, (iii) an aryl group, including substituted and unsubstituted aryl groups, and wherein heteroatoms either may or may not be present in the aryl group, in embodiments having 5 to 100 carbon atoms, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in embodiments having 6 to 100 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in embodiments having 6 to 100 carbon atoms, although in all cases wherein ranges are described herein, the number of carbon atoms can be outside of these ranges.

In embodiments, the gellants can comprise materials disclosed in U.S. patent application Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is incorporated herein by reference herein in its entirety, including a compound of the formula

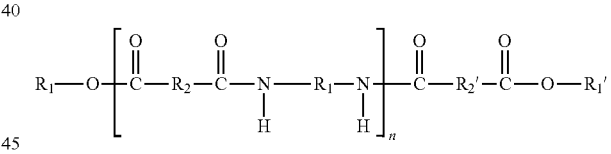

wherein $R_1$ and $R_1'$ each, independently of the other, is an alkyl group having at least one ethylenic unsaturation, in embodiments having 2 to 100 carbon atoms, an arylalkyl group having at least one ethylenic unsaturation, in embodiments having 6 to 100 carbon atoms, or an alkylaryl group having at least one ethylenic unsaturation, in embodiments having 6 to 100 carbon atoms, $R_2$, $R_2'$, and $R_3$ each, independently of the others, are alkylene groups, in embodiments having 2 to 100 carbon atoms, arylene groups, in embodiments having 5 to 100 carbon atoms, arylalkylene groups, in embodiments having 6 to 100 carbon atoms, or alkylarylene groups, in embodiments having 6 to 100 carbon atoms, and n is an integer representing the number of repeat amide units and is at least 1, although in all cases wherein ranges are described herein, the number of carbon atoms can be outside of these ranges.

The gellant compounds can be prepared by any desired or effective method. For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is incorporated by reference herein in its entirety, which describes a process for preparing a compound of the formula

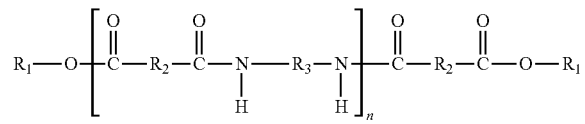

wherein $R_1$ is an alkyl group having at least one ethylenic unsaturation, in embodiments having 2 to 100 carbon atoms, an arylalkyl group having at least one ethylenic unsaturation, in embodiments having 6 to 100 carbon atoms, or an alkylaryl group having at least one ethylenic unsaturation, in embodiments having 6 to 100 carbon atoms, $R_2$ and $R_3$ each, independently of the others, are alkylene groups, in embodiments having 2 to 100 carbon atoms, arylene groups, in embodiments having 5 to 100 carbon atoms, arylalkylene groups, in embodiments having 6 to 100 carbon atoms, or alkylarylene groups, in embodiments having 6 to 100 carbon atoms, and n is an integer representing the number of repeat amide units and is at least 1, or from 1 to 20, although in all cases wherein ranges are described herein, the number of carbon atoms can be outside of these ranges, said process comprising: (a) reacting a diacid of the formula

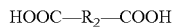

with a diamine of the formula

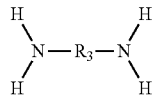

wherein $R_2$ and $R_3$ are as described above, in the absence of a solvent while removing water from the reaction mixture to form an acid-terminated oligoamide intermediate; and (b) reacting the acid-terminated oligoamide intermediate with a monoalcohol of the formula

wherein $R_1$ is as described above, in the presence of a coupling agent and a catalyst to form the product.

In embodiments, the curable sublimation marking material further contains at least one sublimation colorant. If desired, multiple sublimation colorants may be used. The sublimation colorant can be any suitable or desired sublimation colorant. Such colorants may include sublimation dyes and sublimation pigments. Sublimation dyes are commonly referred to as disperse dyes and generally sublime at a temperature between about 120° C. and about 220° C., or up to about 400° C. Typical dyes, classified in the Color Index under the title "Disperse Dyes," generally belong to groups comprising azo, anthraquinone, phthalocyanine, indophenol, indoaniline, perinone, quinophthalone, acridine, xanthone, diazine, and oxazine dyes, and can be diffused into the toner particles. In embodiments, the sublimation colorant comprises a high purity, low salt disperse dye suitable for use in the UV sublimation ink dispersions. For example, Disperse blue 359, Disperse red 60, Disperse yellow 54, and Disperse blue 72 can be selected.

In embodiments, the sublimation colorant is a sublimation dye selected from the group consisting of azo dyes, anthraquinone dyes and phthalocyanine dyes. Colorants commonly used in conventional UV phase change inks can also be selected for the present sublimation marking materials. For example, colorants such as SR 1131®, SR 1126®, and LFC 1708® available from Lamberti USA can be selected.

Suitable sublimation dyes can also include, for example, dyes manufactured by Sensient, such as, Intratherm® Yellow P-1343NT, Intratherm® Yellow P-1346NT, Intratherm® Yellow P-346, Intratherm® Brilliant Yellow P-348, Intratherm® Brilliant Orange P-365, Intratherm® Brown P-1301, Intratherm® Dark Brown P-1303, Intratherm® Pink P-1335NT, Intratherm® Brilliant Red P-1314NT, Intratherm® Red P-1339, Intratherm® Blue P-1305NT, Intratherm® Blue P-1404, C.I. Disperse Blue 359, Intratherm® Orange P-367 Intratherm® Brilliant Blue P-1309, C.I. Disperse Red 60, Intratherm® Yellow P-343NT; dyes manufactured by the Organic Dyestuffs Corporation, Orco® Transfer Blue 2R, Orco® Transfer Scarlet B, Orco® Transfer Yellow 3G, dyes manufactured by ECS Specialty Ink & Dyes, Ltd., such as, Subli® Blue 770, Subli® Red 770, Subli® Yellow 781, Subli® Black 774. Other suitable examples include C.I. Disperse Yellow 3, 23, 25, 42, 54, 64, 79, 82, 83, 93, 99, 100, 119, 122, 124, 126, 160, 184:1, 186, 198, 199, 204, 211, 224 and 237; Disperse Blue 60, C.I. Disperse Orange 1, 3, 7, 13, 25, 29 31:1, 33, 49, 54, 55, 66, 73, 118, 119, and 163; C.I. Disperse Red 1, 13, 54, 60, 72, 73, 86, 88, 91, 92, 93, 111, 126, 127, 134, 135, 143, 145, 152, 154, 159, 164, 167:1, 177, 181, 204, 206, 207, 221, 239, 240, 258, 277, 278, 283, 288, 311, 323, 343, 348, 356 and 362, C.I. Disperse Violet 1, 33,C.I. Disperse Blue 3, 14, 19, 26, 56, 60, 73, 79:1, 87, 87:1, 113, 128, 143, 148, 154, 158, 165, 15:1, 165:2, 176, 180, 183, 185, 197, 198, 201, 214, 224, 225, 257, 266, 267, 287, 354, 359, 365 and 368; C.I. Disperse Green 6:1 and 9, and other suitable dye materials. Other examples include Eastman Fast Yellow 8GLF, Eastman Brilliant Red FFBL, Eastman Blue GBN, Eastman Polyester Orange 2RL, Eastman Polyester Yellow GLW, Eastman Polyester Dark Orange RL, Eastman Polyester Pink RL, Eastman Polyester Yellow 5GLS, Eastman Polyester Red 2G, Eastman Polyester Blue GP, Eastman Polyester Blue RL, Eastone Yellow R-GFD, Eastone Red B, Eastone Red R, Eastone Yellow 6GN, Eastone Orange 2R, Eastone Orange 3R, Eastone Orange GRN, Eastman Red 901, Eastman Polyester Blue 4RL, Eastman Polyester Red B-LSW, Eastman Turquoise 4G, Eastman Polyester Blue BN-LSW, (all available from the Eastman Kodak Co., Rochester, N.Y.). However, a disperse dye is not limited to these dyes.

Other dyes useful in the process of making and using the present curable sublimation marking materials include ICI Disperse Red; DuPont Disperse Blue 60; Bayer Resiren® Red TB; and Bayer Macrolex® G. Additional examples of dyes which may also be suitable for use herein include BASF Lurifix® Blue 590, BASF Lurifix® Orange, BASF Lurifix® Red 380, BASF Lurifix® Red 420, BASF Lurifix® Yellow 150, ICI Dispersol® Red B2B, ICI Dispersol® Yellow BGB and ICI Dispersol® Blue BN. Such dye materials are also available commercially from Keystone Aniline Corporation, Crompton & Knowles, BASF, Bayer, E. I. du Pont de Nemours & Co., Ciba, ICI, and others. In embodiments, the selected dye is thermally and chemically stable, compatible with the polymers in the curable sublimation marking material and with any other additives, and is colorfast.

In embodiments, the sublimation colorant has a low specific heat of from about 1.5 to about 2 Joules per gram-degree Centigrade, and a low latent heat of fusion of from about 20 to about 150 J/g. The melting points of sublimation colorant can be, in embodiments, from about 150° C. to about 250° C. In embodiments, the colorants have a specific heat of about 1.8 Joules per gram-degree Centigrade and have a latent heat of fusion between about 30 and about 120 Joules per gram. The selected dyes sublime easily and are expected to be uniformly imbibed when deposited upon toner particles or other selected marking material. Some of the dyes described above are also disclosed in U.S. Pat. No. 4,081,277, the entire disclosure of which is incorporated herein by reference.

The sublimation colorant may be present in the curable sublimation marking material in any desired or effective amount to obtain the desired color or hue such as from about 0.1 to about 50, from about 0.2 to about 20, or from about 0.5 to about 10 percent by weight of the curable sublimation marking material.

The curable sublimation ink may also include a non-sublimation colorant such as a pigment. The non-sublimation pigment can be any pigment that imparts a color to the ink, but does not sublime at a temperature between about 120° C. and about 300° C. For example, if the curable sublimation ink is employed in a transfer printing process, the non-sublimation pigment may be used to print a first colored image on the transfer substrate. The color of the first colored image is the same color as the non-sublimation pigment. After heat and/or pressure are applied to the transfer substrate, a second colored image that may be the same or entirely different from the first colored image is transferred to the permanent substrate. Such a process would be useful to record different images for document security purposes.

The curable sublimation ink can include different types of sublimation colorants each having different sublimation temperatures one from another. In embodiments, the curable sublimation ink can include a first sublimation colorant having a first sublimation temperature, and a second sublimation colorant having a second sublimation temperature, wherein the first sublimation temperature and the second sublimation temperature are different. In other embodiments, the curable sublimation ink can include a first sublimation colorant having a first sublimation temperature, a second sublimation colorant having a second sublimation temperature, and a third sublimation colorant having a third sublimation temperature, wherein the first sublimation temperature, the second sublimation temperature, and the third sublimation temperature are all different. For example, in embodiments, the curable sublimation ink can include a first sublimation colorant having a sublimation temperature that is higher than about 220° C. and a second, different sublimation colorant having a sublimation temperature that is lower than about 180° C. In other embodiments, the curable sublimation ink can include a first sublimation colorant having a sublimation temperature in the range of about 130° C. to about 180° C., a second sublimation colorant having a sublimation temperature in the range of about 180° C. to about 210° C., and a third sublimation colorant having a sublimation temperature in the range of about 220° C. to about 300° C., in embodiments, wherein each of the first, second, and third sublimation temperatures are different. In this way, curable inks herein containing one or more different sublimation colorants can be used to print multi-colored images on the same transfer substrate. After heating to the different sublimation temperatures, alone or in combination with application of pressure, different permanent images can be achieved. This embodiment can be used for various applications, and in specific embodiments, for security applications.

In embodiments, the curable sublimation ink can comprise a first sublimation colorant having a first sublimation temperature; a second sublimation colorant having a second sublimation temperature; and optionally, one or more additional sublimation colorants; wherein the first sublimation colorant has a first sublimation temperature, the second sublimation colorant has a second sublimation temperature that is different from the first sublimation temperature, and wherein the third or more optional sublimation colorants, if present, each have a sublimation temperature that is different, such that each sublimation colorant has a unique sublimation temperature that is different from the sublimation temperature of every other sublimation colorant present.

In embodiments, the method herein can comprise applying a curable ink having two or more curable sublimation colorants in a desired pattern onto a transfer substrate, wherein each curable sublimation colorant has a unique sublimation temperature that is different from the sublimation temperature of every other sublimation colorant present, to form one or more images on the transfer substrate at a first temperature which is below a sublimation temperature of each of the sublimation colorants present; curing the image on the transfer substrate; and optionally, bringing the transfer substrate into contact with a final image-receiving substrate, optionally applying pressure, and heating to a second, temperature which is sufficient to cause one of the sublimation colorants to sublime and form a permanent image on the final image-receiving substrate, heating to a third temperature which is sufficient to cause another of the sublimation colorants to sublime, and which third temperature is different from the second temperature, and form a permanent image on the final image-receiving substrate, and, repeatedly, heating to each unique temperature of each sublimation colorant present until each of the sublimation colorants present have sublimed.

Examples of suitable pigments for the non-sublimation pigment include PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); Hostaperm® Blue B2G-D (commercially available from Clariant); Hostaperm® Blue B4G (commercially available from Clariant); Permanent Red P-F7RK; Hostaperm® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA PAC® C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan® Blue OS (commercially available from BASF); NEOPEN® Blue FF4012 (commercially available from BASF); PV Fast® Blue B2GO1 (commercially available from Clariant); IRGALITE® Blue BCA (commercially available from Ciba); PALIOGEN® Blue 6470 (commercially available from BASF); Sudan® Orange G (commercially available from Aldrich), Sudan® Orange 220 (commercially available from BASF); PALIOGEN® Orange 3040 (BASF); PALIO- GEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow® 4G VP2532 (commercially available from Clariant); Toner Yellow HG® (commercially available from Clariant); Lumogen® Yellow D0790 (commercially available from BASF); Suco-Yellow® L1250 (commercially available from BASF); Suco-Yellow® D1355 (commercially available from BASF); Suco Fast Yellow® DI 355, DI 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

The non-sublimation colorant may be present in the curable sublimation ink in any desired or effective amount to obtain the desired color or hue such as from about 0.1 to about 20, from about 0.2 to about 15, or from about 0.5 to about 10 percent by weight of the curable sublimation marking material.

In embodiments, a stable dispersion of the sublimation colorant can be prepared in an aqueous solvent, the sublimination colorant particles having a particle size less than about 400 nanometers. The dispersion may also include a suitable dispersing aid, such as, for example dispersant MF, dispersant NND, sodium naphthalene sulphonate and/or surfactants such as, for example, the SURFYNOL® products marketed commercially by Air Products, TAMOL® products by Rohm & Haas, and BYK® products by Byk-Chemie, among others. The dispersions may then be treated to reduce the particle size, for example by grinding, homogenization, grinding followed by homogenization under high pressure, or other mechanical means.

The transfer substrate can be any suitable or desired transfer substrate or device. In embodiments, the transfer substrate comprises a transfer sheet.

The permanent image receiving substrate can be any suitable or desired image receiving substrate. In embodiments, the permanent image-receiving substrate comprises a material selected from the group consisting of wood, plastic, natural cloth, synthetic cloth, carpet material, concrete, glass, metal, porcelain and ceramic.

The curable sublimation ink can be applied by any suitable or desired method. In embodiments, applying the curable sublimation ink comprises traditional printing such as offset imaging, gravure imaging, flexographic imaging, lithographic imaging, ribbon, or screen printing, draw down, among others, or digital imaging including ink jet printing, electrostatographic imaging, xerographic imaging, laser imaging, among others.

The sublimation dye technology herein can be used for providing images on various final substrates. In embodiments, the sublimation transfer printing process herein comprises a process for transferring images onto any suitable or desired substrate. In specific embodiments, the sublimation transfer printing process herein comprises a process for transferring images onto textiles.

The curable sublimation inks herein can be prepared by any suitable or desired method. In embodiments, the UV curable sublimation phase change ink can be prepared by dispersing a sublimation dye or pigment into desired monomers, oligomers, and other desired components using a 2 liter laboratory scale ball-mill followed by homogenization under high pressure, or other mechanical means to provide a dye or pigment dispersion. In embodiments, the pigment has a particle size of from about 50 to about 500 nanometers, or from about 150 to about 300, and in specific embodiments, less than about 300 nanometers.

The curable sublimation inks can be applied to a transfer substrate by any suitable or desired method. In embodiments, the curable sublimation inks can be printed, for example using piezoelectric print heads to produce a full color image on the transfer sheet, such as paper, followed by exposing the printed image using a curing system, in embodiments, a UV curing system or a thermal curing system. In embodiments, the image is cured quickly due to photo-induced crosslinking. The high glass transition temperature of the polymerization resin enables sublimation transfer of the sublimation colorant with no transferring of resin component to the final substrate.

In embodiments, the process is a solvent free process. For example, in embodiments, a 100% UV curable formulation is solvent free, eliminating solvent evaporation and the environmental pollution caused by solvent evaporation.

The curable ink may also include an optional curing agent. Examples of curing agents include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur® W (dicyclohexylmethane diisocyanate curing agent) blocked with methyl ethyl ketoxime; light-stable epoxy resins such as Santolink® LSE 120 supplied by Monsanto; alicyclic poly-epoxides such as EHPE-3150® supplied by Daicel; polyfunctional amines; dicyanodiamide; bisphenol A; bisphenol S; hydrogenated bisphenol; polyphenolics; imidazoles, such as 2-methyl imidazole and 2-phenyl imidazole; betahydroxyalkylamide; uretdione; and polyfunctional isocyanates, such as 2,4-toluene diisocyanate, 2,6-toluene diisocyanate, alkaline diisocyanates, xylene-diisocyanate, isophorone-diisocyanate, methylene-bis(4-phenyl isocyanate), methylene-bis-(4-cyclohexyl)isocyanate, 3,3'-bitoluene-4-4'-diisocyanate, hexamethylene-diisocyanate, and naphthalene 1,5-diisocyanate; as well as other known or later developed curing agents and initiators.

In embodiments, the process may include the use of surfactants, emulsifiers, and other additives such as those discussed above. Likewise, various modifications of the above process will be apparent and are encompassed herein.

The inks described herein may further include other components, such as sublimation colorants and non-sublimation pigments, and various external additives.

In embodiments, any known type of image development system may be used in an image developing device, including, for example, magnetic brush development, jumping single-component development, hybrid scavengeless development (HSD), etc. These development systems are well known in the art, and further explanation of the operation of these devices to form an image is thus not necessary herein.

Once the image is formed with inks described herein via a suitable image development method, such as transfer printing, the image is then printed to an image-receiving medium such as paper and the like and then transferred to different image-receiving medium. Transfer printing is a term broadly used to describe several different families of technology for making an image on a substrate. Those technologies include dye diffusion printing and thermal mass transfer printing.

In embodiments, the ink described herein may be employed in a secondary transfer process. As defined herein, the "secondary transfer process" is the process of transferring only the sublimation colorant to a permanent image-receiving substrate, while the non-transferred components remain on the transfer carrier sheet. The transfer may be accomplished by placing the transfer carrier sheet with the image printed thereon in contact with the surface of the permanent image-receiving substrate, and applying either heat or force to the transfer carrier sheet until the sublimation colorant transfers onto the surface of the permanent image-receiving substrate and forms an image. However, before being transferred to the permanent image-receiving substrate, the chemical toner composition described herein must be printed on the transfer sheet.

Imaging processes can include, for example, preparing an image with a xerographic device including a charging component, an imaging component, a photoconductive component, a developing component, a transfer component, and a fusing component. In embodiments, the development component may include a developer prepared by mixing a carrier with a toner composition described herein. The xerographic device may include a high speed printer, a black and white high speed printer, a color printer, and the like.

Once the image is formed via a suitable image development method such as any one of the aforementioned methods, the image may then be transferred to the transfer sheet.

The transfer sheet may be comprised of a substrate sheet or multiple layers coated directly on top of the substrate sheet. Examples of additional layers coated on the substrate sheet include a peel layer, a scratch resistant layer, and/or an adhesive layer. Examples of transfer sheets are described in U.S. Pat. Nos. 7,033,974, 7,138,163, 6,951,696, 6,946,424, 7,510,617, 6,849,311 and 6,800,166, the disclosures of which are incorporated by reference herein in their entirety.

Any substrate sheet used in conventional transfer sheets may be used as long as the substrate sheet has some level of heat resistance and strength. Suitable examples of substrate sheets include tissue papers, such as glassine paper, capacitor paper, and paraffin paper; and films of plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers. The thickness of the substrate sheet may be properly varied depending upon materials for the substrate sheet so that the substrate sheet has proper strength, heat resistance and other properties. In embodiments, the thickness of the substrate sheet may be from about 10 to about 100 μm, from about 20 to about 80 μm and from about 30 to 75 μm.

The ink composition may be employed in a dye diffusion thermal transfer processes, wherein only the sublimation colorant is transferred to the image-receiving substrate by a dye diffusion thermal transfer process. Details of this process are described in U.S. Pat. Nos. 5,436,217, 5,902,771, 5,917,530, 6,052,139 and 6,057,264, each of which are incorporated by reference herein in their entirety.

Before the printed image transferred to a permanent image-receiving substrate, the image can be cured, so that only the sublimation colorant are transferred to the permanent image-receiving substrate. This curing can occur either during fusing, for example, via thermal curing wherein the polyester resin(s) crosslink upon heating or after fusing, for example, using actinic radiation. Examples of curing methods include thermal curing, ultraviolet radiation curing and free radical curing, which are described in U.S. Patent Application Pub. No. 2006/0100300, the disclosure of which is incorporated by reference in its entirety.

In embodiments where the ink is crosslinkable, such crosslinking may be accomplished in any suitable manner. For example, the ink may be crosslinked during fusing of the ink to the substrate where the ink is crosslinkable at the fusing temperature. Crosslinking also may be effected by heating the fused image to a temperature at which the ink will be crosslinked, for example in a post-fusing operation. In embodiments, crosslinking may be effected at temperatures of from about 200° C. or less, from about 70° C. to about 200° C., or from about 80° C. to about 180° C.

The curing may occur after fusing via an actinic radiation energy source having a wavelength in the ultraviolet or visible region of the spectrum, accelerated particles, such as electron beam radiation, thermal such as heat or infrared radiation, or the like. In embodiments, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, sunlight, and the like.

Ultraviolet radiation, especially from a medium pressure mercury lamp with a high speed conveyor under UV light, such as about 20 to about 70 m/min, can be used in embodiments, wherein the UV radiation is provided at a wavelength of about 200 to about 500 nm for about less than one second, although the disclosure is not limited thereto. In embodiments, the speed of the high speed conveyor can be about 15 to about 35 m/min under UV light at a wavelength of about 200 to about 500 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

In embodiments, the ink is brought into contact with a permanent image-receiving sheet and selectively, in accordance with a pattern information signal, heated to a temperature of about 100° C. to about 300° C. with a thermal printing head provided with a plurality of juxtaposed heat-generating resistors. Upon heating, the sublimation colorant is transferred from the selectively heated regions of the image receiver sheet and forms a pattern thereon. The shape and density of pattern on the permanent image-receiving substrate depend upon the pattern and intensity of heat applied to the toner composition. Examples of permanent image-receiving substrates include various materials such as wood, plastic, natural cloth, synthetic cloth, carpet material, concrete, glass, metal such as steel, porcelain and ceramic. Virtually any substrate can be used that can withstand a temperature of at least 145° C. for at least 10 seconds. The surface of suitable substrate could be coated by such as polyester coating material.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of colorant dispersion. Into a 100 milliliter beaker was added 1 gram of sublimation dye Disperse Blue 359, 0.53 grams (16.94 weight %) anionic surfactant (Tayca Corporation), and 18.5 grams of deionized water. The above mixture was sonicated for about 15 minutes, followed by centrifuge. The obtained dispersion had an average particle size of 310 nanometers, and a solid content of 1.66%.

Example 2

Curable ink solution preparation. Into a 100 milliliter beaker was added 8 grams of the Disperse Blue 359 dispersion of Example 1, and 8 grams (30 weight %) of unsaturated amorphous linear propoxylated bisphenol A fumarate resin emulsion (available under the trade name SPARII™ from Resana S/A Industrias Quimicas, Sao Paulo Brazil) which contains 4 weight % photo-initiator (Irgacure® 819). The curable ink solution mixture was stirred for about 10 minutes with a magnetic bar.

Example 3

Figure 2:
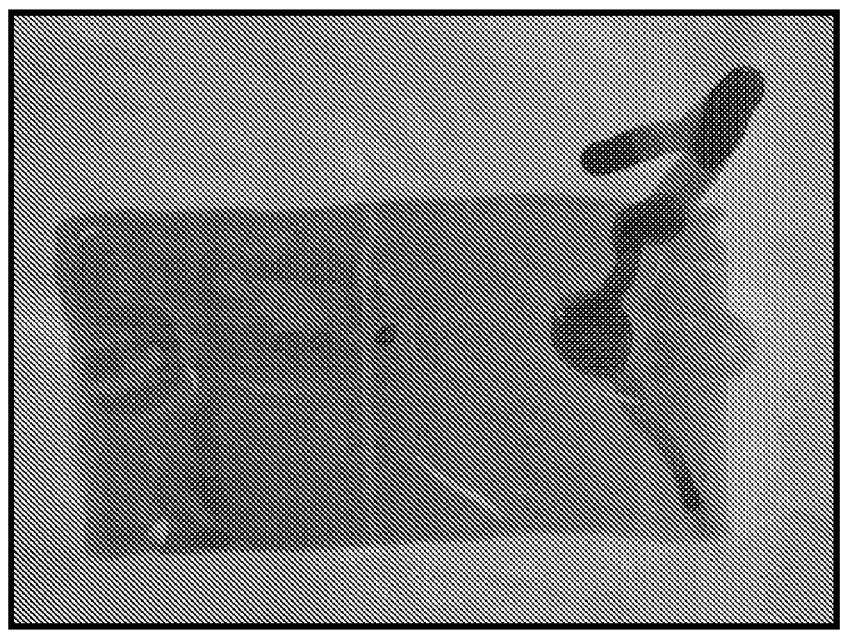
FIG. 2 illustrates a sublimation dye image (before curing) drawn down on white Instro® Glass coated paper.

Image formation. 2 drops of the ink solution of Example 2 were dropped onto 120 gsm (grams/m$^2$) DCEG® (Digital Color Elite Gloss) coated paper and drawn down with a draw bar. 2 drops of the ink solution of Example 2 were dropped onto 120 gsm white Instro Glass coated paper and drawn down with a draw bar. The obtained images had poor adhesion to both kinds of paper and were scratched off by a human nail, before curing, as shown in FIG. 1 (DCEG® paper) and FIG. 2 (white Instro Glass coated paper), respectively.

Example 4

Figure 3:
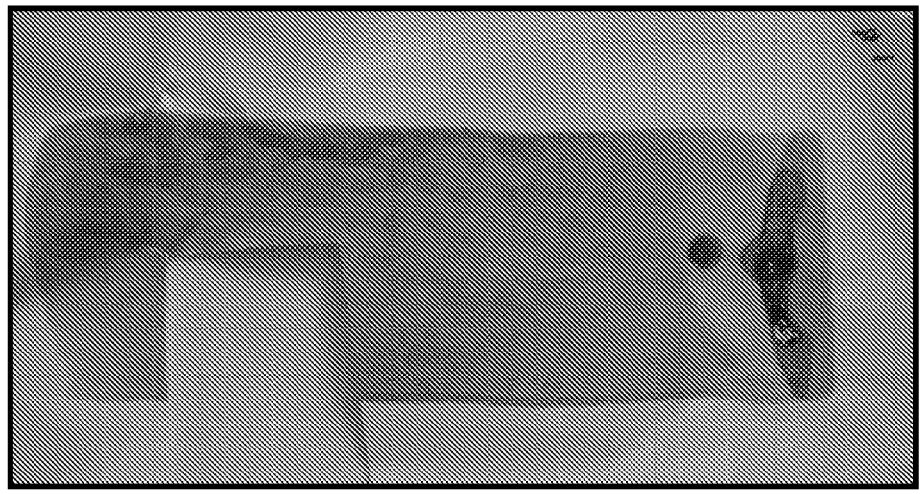
FIG. 3 illustrates a sublimation dye image (after curing) drawn down on Xerox® Digital Color Elite Gloss Paper coated paper.
Figure 4:
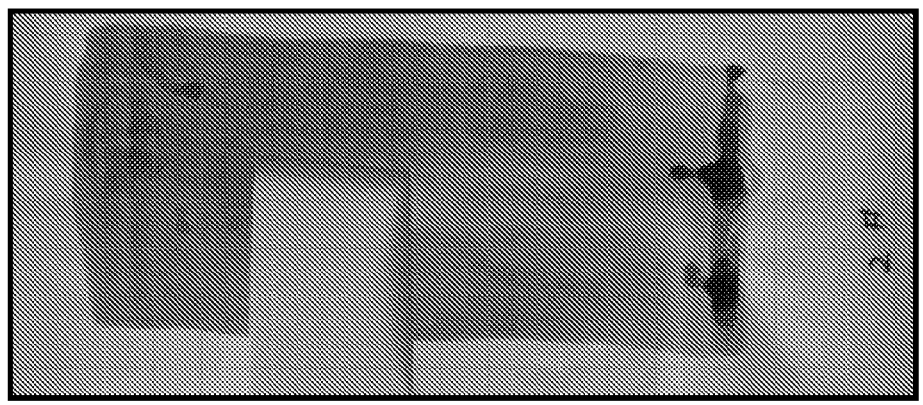
FIG. 4 illustrates a sublimation dye image (after curing) drawn down on white Instro® Glass coated paper.

Image curing. The drawn down images of Example 3 were cured using Fusion® UV system. The curing system was turned on, and the belt speed was adjusted to 32 feet per minute. The images of Example 3 were placed on the transport belt and the images were treated under the UV lamp for 4 passes to confirm that the images were cured completely. The images had good adhesion to the paper and could not be scratched off, as shown in FIG. 3 (DCEG® paper) and FIG. 4 (white Instro Glass coated paper), respectively.

Example 5

Figure 5:
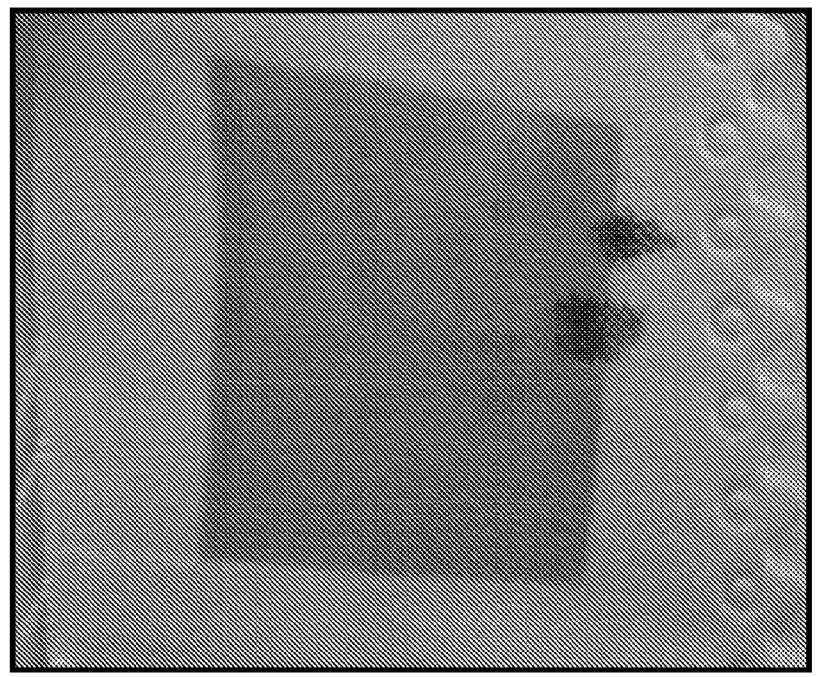
FIG. 5 illustrates a sublimation dye image drawn down on Xerox® Digital Color Elite Gloss Paper coated paper after curing and transfer to a polyester fabric.
Figure 6:
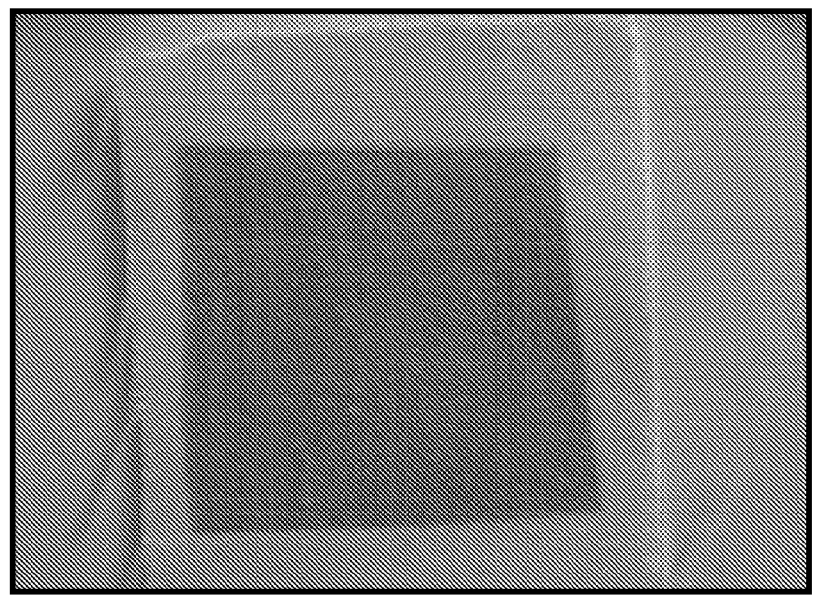
FIG. 6 illustrates a sublimation dye image drawn down on white Instro® Glass coated paper after curing and transfer to a polyester fabric.

Image transfer. The cured images were transferred to a polyester fabric using a hot plate set at 190° C. with pressure as follows. The hot plate was heated to 190° C. A small piece of each of the above papers of Example 3 with cured images were cut and placed on the hot plate with the image side facing up, and a pieced of white polyester fabric was placed on top of the cured image. A second iron plate was used to apply pressure to the polyester fabric for about 150 seconds. The images were transferred to the polyester perfectly, without transferring of the cured resin (that is, no resin adhesive transferred to the polyester fabric), and the fabric stayed flexible with a vivid image. The transferred images on the polyester are shown FIG. 5 (DCEG® paper) and FIG. 6 (white Instro Glass coated paper), respectively.

Comparative Example 6

Figure 7:
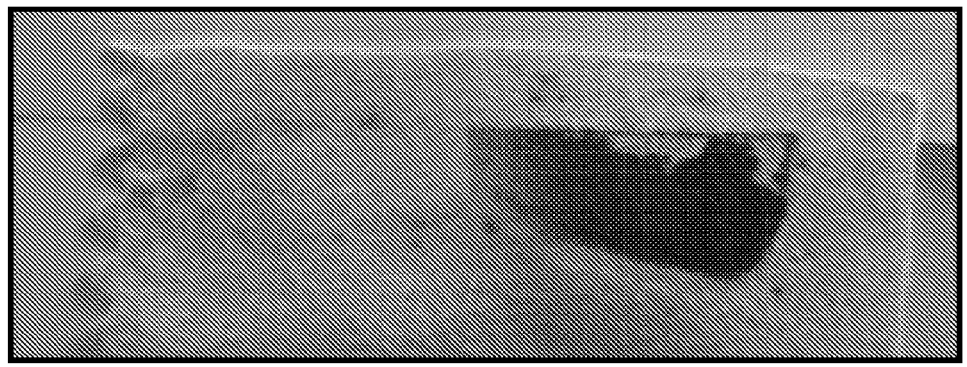
FIG. 7 illustrates a sublimation dye image drawn down on white Instro® Glass coated paper and transfer to a polyester fabric without curing.

As comparison, an image formed as in Example 3, was transferred to polyester fabric without exposure to a curing stage. The darkness of the image was caused by resin offset to the polyester fabric. FIG. 7 shows the transferred image on the polyester fabric from the non-cured image on the 120 gsm white Instro glass coated paper (inflexible fabric with dark color). The image on the fabric (resin/dye) was tacky when heated, and became stiff and inflexible when cooled down.

Example 7

The following example is prepared by dissolving the initiating agents in the oil soluble components with stirring. After complete dissolution, stirring is continued while the optional colorant is added to the solution. Finally, the temperature of the mixture is raised to about 110° C., above the melting point of the thermal solvent, and the thermal solvent is added with continuous stiffing.

TABLE 1

| Example 7 | Component | % by Weight |
|---|---|---|
| Oil soluble components | Alkoxylated tetrahydrofurfuryl acrylate (Sartomer CD611 ®) | 15 |
| | Trifunctional polyether acrylate (Laromer PO 43 F ®, BASF | 12 |
| | Alkoxylated aliphatic diacrylate (Sartomer SR9209 ®) | 25 |
| Thermal solvents | 1,10-decanediol, MP = 72° C. | 30 |
| Colorant | Disperse Blue 359 | 6 |
| Initiating agents | IRGACURE 369 ® (Ciba) | 1.0 |
| | IRGACURE 907 ® (Ciba) | 2.0 |

The example is further subjected to print testing using a modified XEROX PHASER® 850 ink jet printer, in which the temperature set points are reduced to 75° C. and transfused sharp images to 120 grams per square meter (gsm) white Instro Gloss coated paper. Transfuse of the ink composition is demonstrated between 200 to 500 pounds per square inch (psi) transfuse roll pressure. A standard PHASER® 860 drum, with standard oiling rates of 3-6 mg/page and standard transfuse rates of 20 inches/second is used for the print testing of the ink composition of Example 7. The drum temperature is controlled at 32° C. throughout testing. Extremely robust images are obtained upon curing the jetted ink composition of Example 7 using a UV Fusion® D bulb. A sample of the ink composition of Example 7 is cured on a glass slide under illumination from 415 nanometers LED array from UV Process Supplies.

The cured images are transferred to a polyester fabric using a hot plate set at 190° C. with pressure as follows. The hot plate is heated to 190° C. A small piece of each of the above coated papers with cured images is cut and placed on the hot plate with the image side facing up, and a pieced of white polyester fabric is placed on top of the cured image. A second iron plate is used to apply pressure to the polyester fabric for about 150 seconds. The images transfer to the polyester perfectly, without transferring of the cured resin (that is, no resin adhesive transfers to the polyester fabric), and the fabric stays flexible with a vivid image.

Example 8

An ultra-violet curable phase change gellant ink is prepared containing 7.5 percent by weight curable amide gellant as described in Example VIII of U.S. Pat. No. 7,279,587, and propoxylated neopentyl glycol diacrylate (SR9003®, Sartomer Co. Inc.) which are combined and stirred at 90° C. for 1 hour. The resulting mixture is filtered to 0.22 µm at 90° C., let cool to room temperature overnight, re-melted, and filtered to 0.22 µm at 90° C. To the resulting solution is then added 2-dimethylamino-2-(4-methylbenzyl)-1-(4-morpholin-4-ylphenyl)-butanone (IRGACURE® 379, Ciba Specialty Chemicals), isopropyl-9H-thioxanthen-9-one (DAROCUR® ITX, Ciba Specialty Chemicals), bis(2,4,6-trimethylbenzoyl)-phenyl-phosphine oxide (IRGACURE® 819, Ciba Specialty Chemicals), 2-hydroxy-1-(4-(4-(2-hydroxy-2-methylpropionyl)-benzyl)-phenyl)-2-methylpropan-1-one (IRGACURE® 127, Ciba Specialty Chemicals), and IRGASTAB® UV10 (Ciba Specialty Chemicals), and the entire solution is stirred for 1 hour at 90° C. The ink base thus prepared is then filtered to 0.22 µm and the hot solution (90° C.) is added dropwise to a stirring solution of the desired sublimation dispersion (Disperse Blue 359 dispersion, 25 weight %, Disperse Yellow 54 dispersion, 16 weight %, Disperse Red 60 dispersion, 21 weight %,), also at 90° C. The resulting inks are then filtered to 6 µm.

Inks are jetted using a PHASER® 860 printer modified to change the intermediate transfer drum temperature, paper preheating temperature, and ink heating temperature and printed at temperatures ranging from 75 to 85° C. directly onto paper attached to an intermediate transfer member at 30° C. The inks are successfully jetted onto 120 gsm white Instro Gloss coated paper and 120 gsm DCEG® (Digital Color Elite Gloss) coated paper.

After printing, the markings are cured by exposure to UV light from a UV Fusion® LC-6B Benchtop Conveyor equipped with UV Fusion® Light Hammer® 6 Ultraviolet Lamp System employing a "D" bulb for a minimum of 2-3 seconds to provide robust structures. It is believed that the prints cannot be scratched nor smudged.

The cured images are transferred to a polyester fabric using a hot plate set at 190° C. with pressure as follows. The hot plate is heated to 190° C. A small piece of each of the above coated papers with cured images is cut and placed on the hot plate with the image side facing up, and a pieced of white polyester fabric is placed on top of the cured image. A second iron plate is used to apply pressure to the polyester fabric for about 150 seconds. The images are transferred to the polyester perfectly, without transferring of the cured resin (that is, no resin adhesive transfers to the polyester fabric), and the fabric stays flexible with a vivid image.

The sublimation colorant transfer process herein uses, in embodiments, a UV curable composition. (for example, UV curable ink) that provides a robust print in a first process step. In various embodiments, advantages of the present process include that the resin does not offset onto the permanent substrate, the process does not require solvent, a "greener" transfer process is provided requiring less energy than previous processes and reduced pollution as well as less unwanted transfer of resin to the substrate. In further embodiments, the sublimation colorant sublimes from the transfer sheet when heated even after being "trapped" by curing in a cross-linked polymer.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A transfer printing method comprising:
    applying a curable sublimation ink comprising at least one curable component and at least one sublimation colorant in a desired pattern onto a transfer substrate to form an image on the transfer substrate at a first temperature which is below a sublimation temperature of the sublimation colorant;
    curing the image on the transfer substrate; and
    bringing the transfer substrate into contact with a final image-receiving substrate, optionally applying pressure, and heating to a second temperature which is sufficient to cause the sublimation colorant to sublime and form a permanent image on the final image-receiving substrate.

2. The method of claim 1, wherein the curable sublimation ink is a traditional imaging material comprising at least one curable component; at least one monomer, and at least one initiator; or
    wherein the curable sublimation ink is a digital imaging material comprising at least one curable component; at least one monomer, oligomer, or prepolymer; optionally, at least one gellant, and at least one initiator.

3. The method of claim 1, wherein the curable sublimation ink comprises a digital imaging material comprising an aqueous ink jet ink, an oil ink, a solid ink, a phase change ink, or a phase change gellant ink.

4. The method of claim 1, wherein the curable sublimation ink is a phase change ink comprising at least one curable component; at least one monomer, oligomer, or prepolymer; optionally, at least one gellant, and at least one initiator;
    wherein the at least one curable component comprises an acrylate, methacrylate, alkene, vinyl, or allylic ether functional group;
    wherein the at least one monomer, oligomer, or prepolymer is an acrylate monomer, a methacrylate monomer, a multifunctional acrylate monomer, a multifunctional methacrylate monomer, a difunctional cycloaliphatic acrylate monomer, a trifunctional monomer, an acrylate ester, a dimethanol diacrylate cyclohexane difunctional monomer, an isocyanurate triacrylate trifunctional monomer, behenyl acrylate, acrylate curable wax, a low viscosity polyester acrylate monomer, a urethane acrylate, an epoxy, a polyester, or a mixture or combination thereof; and
    wherein the initiator is a free-radical photoinitiator or photoinitiating moiety or an ultraviolet radiation activated photoinitiator.

5. The method of claim 1, wherein the curable sublimation ink is an ultra-violet curable phase change ink comprising at least one low viscosity monomer, at least one high molecular weight monomer or oligomer, and an initiator.

6. The method of claim 1, wherein the sublimation colorant is a sublimation dye selected from the group consisting of azo dyes, anthraquinone dyes and phthalocyanine dyes.

7. The method of claim 1, wherein curing is thermal curing or radiation curing.

8. The method of claim 1, wherein the permanent image-receiving substrate comprises a material selected from the group consisting of wood, plastic, natural cloth, synthetic cloth, carpet material, concrete, glass, metal, porcelain and ceramic.

9. The method of claim 1, wherein applying the curable sublimation ink comprises applying the ink by ink jet printing, draw down, offset imaging, gravure imaging, flexographic imaging, lithographic imaging, ribbon printing, or screen printing.

10. The method of claim 1, wherein the process comprises a solvent free process.

11. A transfer printing method comprising:
applying a curable sublimation ink comprising at least one curable component and at least one sublimation colorant in a desired pattern onto a transfer substrate to form an image on the transfer substrate at a first temperature which is below a sublimation temperature of the sublimation colorant;
wherein applying the curable sublimation ink comprises applying a curable ink having two or more sublimation colorants in a desired pattern onto a transfer substrate, wherein each sublimation colorant has a unique sublimation temperature that is different from the sublimation temperature of every other sublimation colorant present, to form one or more images on the transfer substrate at a first temperature which is below a sublimation temperature of each of the sublimation colorants present;
curing the image on the transfer substrate; and
optionally, bringing the transfer substrate into contact with a final image-receiving substrate, optionally applying pressure, and heating to a second, temperature which is sufficient to cause one of the sublimation colorants to sublime and form a permanent image on the final image-receiving substrate, heating to a third temperature which is sufficient to cause another of the sublimation colorants to sublime, and which third temperature is different from the second temperature, and form a permanent image on the final image-receiving substrate, and, repeatedly heating to each unique temperature of each sublimation colorant present until each of the sublimation colorants present have sublimed.

12. A curable sublimation ink of comprising at least one curable component and at least one sublimation colorant, wherein the curable sublimation ink is a traditional imaging material comprising at least one curable component; at least one monomer, and at least one initiator.

13. A curable sublimation ink comprising at least one curable component and at least one sublimation colorant, wherein the curable sublimation ink is a phase change ink comprising at least one curable component; at least one monomer, oligomer, or prepolymer; optionally, at least one gellant, and at least one initiator;
wherein the at least one curable component comprises an acrylate, methacrylate, alkene, vinyl, or allylic ether functional group;
wherein the at least one monomer, oligomer, or prepolymer is an acrylate monomer, a methacrylate monomer, a multifunctional acrylate monomer, a multifunctional methacrylate monomer, a difunctional cycloaliphatic acrylate monomer, a trifunctional monomer, an acrylate ester, a dimethanol diacrylate cyclohexane difunctional monomer, an isocyanurate triacrylate trifunctional monomer, behenyl acrylate, acrylate curable wax, a low viscosity polyester acrylate monomer, a urethane acrylate, an epoxy, a polyester, or a mixture or combination thereof; and
wherein the initiator is a free-radical photoinitiator or photoinitiating moiety or an ultraviolet radiation activated photoinitiator.

14. The curable sublimation ink of claim 13, wherein the sublimation colorant is a sublimation dye selected from the group consisting of azo dyes, anthraquinone dyes and phthalocyanine dyes.

15. A curable sublimation ink comprising at least one curable component and at least one sublimation colorant, wherein the curable sublimation ink is an ultra-violet curable phase change ink comprising at least one low viscosity monomer, at least one high molecular weight monomer or oligomer, and an initiator.

16. The curable sublimation ink of claim 15, wherein the sublimation colorant is a sublimation dye selected from the group consisting of azo dyes, anthraquinone dyes and phthalocyanine dyes.

17. A curable sublimation ink comprising at least one curable component and two or more sublimation colorants, comprising:
a first sublimation colorant having a first sublimation temperature;
a second sublimation colorant having a second sublimation temperature; and
optionally, one or more additional sublimation colorants;
wherein the first sublimation colorant has a first sublimation temperature, the second sublimation colorant has a second sublimation temperature that is different from the first sublimation temperature, and wherein the one or more optional additional sublimation colorants, if present, each have a sublimation temperature that is different, such that each sublimation colorant has a unique sublimation temperature that is different from the sublimation temperature of every other sublimation colorant present.

* * * * *